(12) United States Patent
Arai et al.

(10) Patent No.: US 6,439,175 B2
(45) Date of Patent: Aug. 27, 2002

(54) CONTROL APPARATUS AND METHOD FOR INTERNAL COMBUSTION ENGINE WITH VARIABLY OPERATED ENGINE VALVE

(75) Inventors: Masahiro Arai, Yokohama; Takao Kawasaki, Kanagawa, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/734,611

(22) Filed: Dec. 13, 2000

(30) Foreign Application Priority Data

Dec. 15, 1999 (JP) ............................................ 11-356401

(51) Int. Cl.$^7$ ................................................. F01L 9/04
(52) U.S. Cl. ................................ 123/90.11; 123/90.15; 123/348; 123/403; 123/321
(58) Field of Search ........................... 123/90.15, 90.16, 123/90.17, 90.18, 347, 348, 399, 403, 321, 322, 345, 346

(56) References Cited

U.S. PATENT DOCUMENTS

| 6,039,026 | A | | 3/2000 | Shiraishi et al. ............ 123/399 |
| 6,079,397 | A | | 6/2000 | Matsumoto et al. ........ 123/698 |
| 6,161,521 | A | * | 12/2000 | Russ .......................... 123/324 |
| 6,167,863 | B1 | * | 1/2001 | Kazama ...................... 123/295 |
| 6,182,636 | B1 | * | 2/2001 | Russell ....................... 123/399 |

FOREIGN PATENT DOCUMENTS

| EP | 0 953 750 | 11/1999 |
| JP | 5-71370 | 3/1993 |
| JP | 11-117777 | 4/1999 |
| JP | 11-311135 | 11/1999 |

OTHER PUBLICATIONS

U.S. patent application Ser. No. 09/299,098, Nagaishi et al., filed Apr. 25, 1999.

* cited by examiner

Primary Examiner—Thomas Denion
Assistant Examiner—Jaime Corrigan
(74) Attorney, Agent, or Firm—Foley & Lardner

(57) ABSTRACT

In control apparatus and method for an internal combustion engine having variably operated engine valves, a target vacuum pressure is calculated on the basis of an engine driving condition and an opening angle of an electronically controlled throttle valve is disposed in an intake air passage to achieve the target vacuum pressure. A target air quantity to be sucked within an engine cylinder on the basis of the engine driving condition is calculated and a valve closure timing of an intake valve of, e.g., an electromagnetic operation type is controlled to achieve the target air quantity. At this time, in accordance with the target vacuum pressure TBOOST(or in accordance with an actual vacuum pressure BOOST detected by means of a vacuum pressure sensor), the target air quantity to calculate the valve closure timing of the intake valve calculated on the basis of target air quantity is corrected or the intake valve closure timing IVC per se is corrected by a correction value of $\Delta$IVC.

36 Claims, 9 Drawing Sheets

CONTROL APPARATUS AND METHOD FOR INTERNAL COMBUSTION ENGINE WITH VARIABLY OPERATED ENGINE VALVE

BACKGROUND OF THE INVENTION

1. Field of the Invention

The present invention relates generally to control apparatus and method for an internal combustion engine with variably operated engine valves in which a variable valve drive unit through which an open-and-closure operation of one of the engine valves, viz., an intake valve is arbitrarily controllable is installed and which controls a closure timing of an intake valve to regulate an air quantity sucked into an engine cylinder.

2. Description of the Related Art

A Japanese Patent Application First Publication No. Heisei 11-117777 published on Apr. 27, 1999 (which corresponds to a U.S. Pat. No. 6,039,026 issued on Mar. 21, 2000) exemplifies a previously proposed electromagnetically operated engine valve open-and-closure timing controlling apparatus for an internal combustion engine.

In the previously proposed electromagnetically operated engine valve open-and-closure timing controlling apparatus, open-and-closure operation of engine valves, for example, an intake valve can arbitrarily be controlled using variably operated engine valve drive mechanisms and an intake air quantity sucked into a corresponding engine cylinder is controlled by varying a valve closure timing of the intake valve, with the intake valve closure at a time point when a piston reaches to an intake stroke bottom dead center as a latest valve closure timing (so called, an earlier valve closure timing control).

Since such an electromagnetically operated valve open-and-closure timing controlling apparatus as described above has an object of an improvement in a fuel consumption through a non-throttle drive (viz., a state wherein an engine throttle valve of an electronic control type is at a full open state) (also-called, a reduction in a pumping loss), the engine is basically driven, an air pressure within an intake air passage being equivalent to the atmospheric pressure. An air quantity to be sucked within the cylinder is controlled by a cylinder volume at the time point of the closure of the intake valve.

SUMMARY OF THE INVENTION

In order to cope with an occurrence in a request to develop a vacuum pressure in the engine during a low engine coolant temperature, from a purge system of vaporized fuel, from a blow-by gas ventilation system, and/or from a brake master vac.(a brake booster of a master cylinder of a vehicular brake system), it is often necessary for the electromagnetically operated engine valve open-and-closure timing controlling apparatus to further control a position of the electronically controlled throttle valve to develop a desired vacuum pressure within a portion of the intake air passage located downstream to the throttle valve.

While the air quantity to be sucked into the engine cylinder is controlled according to the valve closure timing of the intake valve, the air quantity is controlled according to a cylinder volume at the time of closure of the intake valve. Hence, in a case where a pressure variation occurs within the intake air passage, an air density is accordingly varied so that an intake air mass within the corresponding engine cylinder is also varied. Especially, in a case where a target vacuum pressure is variably controlled in response to the occurrence in the request to develop the vacuum pressure, the previously proposed electromagnetically operated engine valve open-and-closure timing controlling apparatus described in the Background of the Invention cannot cope with such a pressure variation as described above in the intake air passage.

It is therefore an object of the present invention to provide control apparatus and method for an internal combustion engine which can achieve a cylinder intake air mass which meets with a demanding torque irrespective of a variation in air pressure within a portion of an intake air passage located downstream to an electronically controlled throttle valve even if a desired vacuum pressure is provided in an intake air passage while performing an air quantity control through a variably operated engine valve and which can improve a control accuracy of intake air quantity.

According to one aspect of the present invention, there is provided a control apparatus for an internal combustion engine, comprising: a variably operated intake valve enabled for its open-and-closure operation to be arbitrarily controlled; a target air quantity calculating section that calculates a target air quantity to be sucked into an engine cylinder on the basis of an engine driving condition; a target vacuum pressure calculating section that calculates a target vacuum pressure on the basis of the engine driving condition; a throttle valve controlling section that controls a throttle valve disposed in an intake air passage of the engine to achieve the target vacuum pressure; and an intake valve open-and-closure timing controlling section that calculates and controls valve open and closure timings of the variably operated intake valve to achieve the target air quantity, the valve closure timing of the intake valve being varied in accordance with a vacuum pressure developed within a portion of the intake air passage which is located downstream to the throttle valve.

According to another aspect of the present invention, there is provided a control method for an internal combustion engine, comprising: providing a variably operated intake valve enabled for its open-and-closure operation to be arbitrarily controlled; calculating a target air quantity to be sucked into an engine cylinder on the basis of an engine driving condition; calculating a target vacuum pressure on the basis of the engine driving condition; calculating an opening of a throttle valve disposed in an intake air passage of the engine to achieve the target vacuum pressure; controlling the opening of the throttle valve in accordance with a result of calculation of the opening of the throttle valve; calculating valve open and closure timings of the variably operated intake valve to achieve the target air quantity; and controlling the valve closure timing of the variably operated intake valve in accordance with a result of calculation of the valve closure timing of the intake valve, the controlled valve closure timing of the intake valve being varied in accordance with a vacuum pressure developed within a portion of the intake air passage which is located downstream to the throttle valve.

This summary of the invention does not necessarily describe all necessary features so that the invention may also be a sub-combination of these described features.

DETAILED DESCRIPTION OF THE PREFERRED EMBODIMENTS

Reference will hereinafter be made to the drawings in order to facilitate a better understanding of the present invention.

Figure 1A:
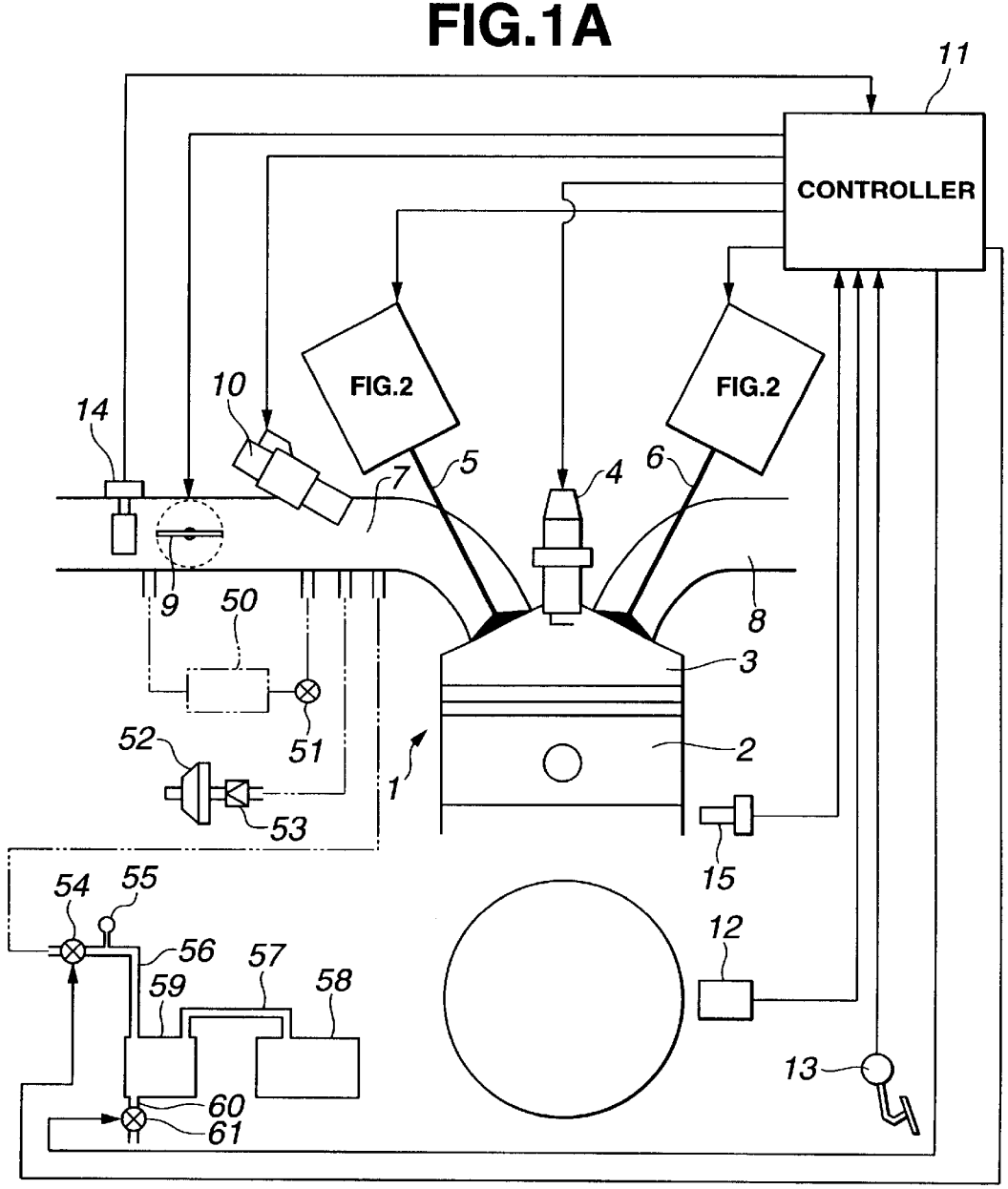
FIG. 1A is a rough system configuration view of an internal combustion engine to which a control apparatus of a first preferred embodiment according to the present invention is applicable.

FIG. 1A shows a rough configuration view of an internal combustion engine to which a control apparatus in a first preferred embodiment according to the present invention is applicable.

Figure 1B:
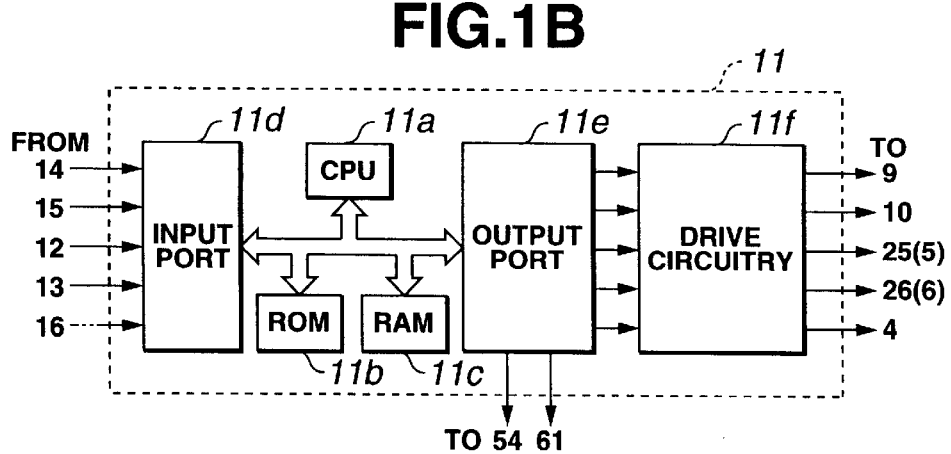
FIG. 1B is a schematic circuit block diagram of a controller shown in FIG. 1A.

FIG. 1B shows a schematic circuit block diagram of a controller shown in FIG. 1A.

In FIG. 1A, electromagnetically operated intake valve 5 and exhaust valve 6 are disposed on a cylinder head so as to enclose a spark plug 4 in a combustion chamber 3 defined by means of a piston 2 of each cylinder of the engine 1.

In FIG. 1A, an intake air passage 7 and an exhaust passage 8 are disposed in the engine 1.

Figure 2:
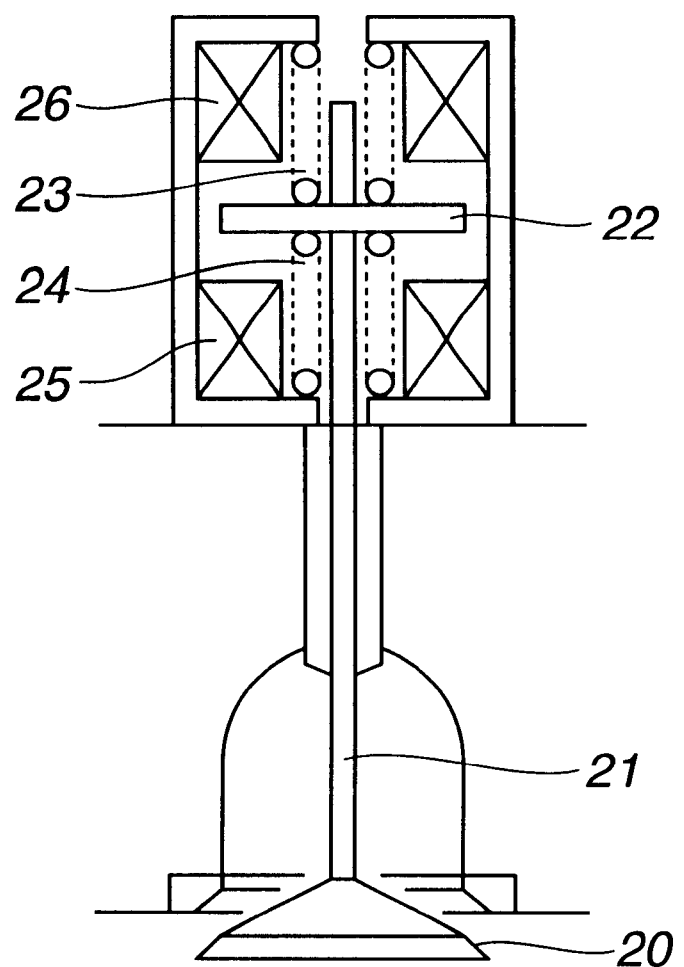
FIG. 2 is a basic conceptual diagram of an electromagnetic type variably operated engine valve applicable to intake and exhaust valves of the engine shown in FIG. 1A.

FIG. 2 shows a basic conceptual structure of an electromagnetic valve drive unit and integrated engine valve for a corresponding one of the intake and exhaust valves 5 and 6 shown in FIG. 1A.

A plate-like armature 22 is integrally attached onto a valve axle 21 of a valve body 20 to form a movable element. The armature 22 is biased at a neutral position between a full open position of valve body 20 with respect to a valve seat and a full closure position thereof by means of pair of springs 23 and 24.

A valve opening electromagnet 25 is disposed at a lower position so as to face vertically toward a rear end of the movable element 22 and a valve closing electromagnet 26 is displaced vertically at an upper position so as to face vertically toward a front end of the movable element 22.

When the engine valve is to be opened, a power supply from a controller 11 to an upper valve closing magnet coil portion 26 is turned off to de-energize it and, thereafter, the power supply therefrom to a lower valve opening electromagnet coil portion 25 is turned on to energize it and the movable element 22 is magnetically attracted onto the lower valve opening electromagnetic coil 25 so that valve body 20 is lifted in a downward direction to open the valve. On the contrary, when the valve is to be closed, the power supply to lower valve opening electromagnetic coil portion 25 is turned off and, thereafter, the power supply to upper valve closing electromagnetic coil portion 26 is turned on. Hence, movable element 22 can be attracted onto the rear surface of upper valve closing electromagnet coil portion 26. Then, valve body 20 is seated on a valve seat so that the intake valve (exhaust valve) can be at the full closure portion. The valve body 20 and the valve axle 21 shown in FIG. 2 correspond to the intake valve 5 or the exhaust valve 6 shown in FIG. 1A. In addition, the valve opening and closing electromagnetic coil portions 25 and 26 are connected to controller 11 shown in FIG. 1A.

Referring back to FIG. 1A, an electronically controlled throttle valve 9 (the throttle valve is driven by means of, e.g., a DC motor) is disposed on a collecting portion of the intake air passage 7 which is common to all cylinders. An electromagnetic type fuel injection valve 10 is disposed on a part of intake port for each cylinder.

It is noted that a blow-by gas ventilator ((i.e., a crankcase) 50 and PCV (Positive Crankcase Ventilation) valve 51 are interposed between a portion of the intake air passage 7 which is located downstream to the throttle valve 9 and a portion of the intake air passage 7 which is located upstream to the throttle valve 9 as a crankcase ventilation system, a master vac. (also called, a brake booster in a master cylinder) of a vehicular brake system with a check valve 53 is linked to the portion of the intake air passage 7 which is located at the downstream side to the throttle valve 9, and a vaporized fuel purge system having a purge control valve 54 connected to controller 11, a flow passage pressure detector 55, a second passage 56, a canister 59, a first passage 57, a fuel tank 58, and a drain cutting valve 61 is linked to the same upstream portion of intake air passage 7 to the throttle valve 9.

It is noted that the vaporized fuel purge system is also exemplified by a U.S. Pat. No. 6,079,397 issued on Jun. 27, 2000 (disclosure of which is herein incorporated by reference).

Controller 11 controls operations of intake valve 5, exhaust valve 6, electronically controlled throttle valve 9, fuel injection valve 10, spark plug 4, purge control valve 54, and drain cutting valve 61.

Controller 11 receives output signals from a crank angle sensor 12, an accelerator pedal depression sensor 13, an airflow meter 14, and a coolant temperature sensor 15.

The crank angle sensor 12 outputs a crank angular signal in synchronization with an engine revolution so that controller 11 can detect a crank angular position and an engine revolution number per time in rpm (engine speed Ne). The accelerator pedal depression sensor 13 detects an accelerator depression angle APO (or accelerator pedal depression depth) and includes an idle switch which is turned on when the accelerator pedal is fully closed. The airflow meter 14 measures an intake air quantity Qa at a position of intake air passage 7 upstream to the throttle valve 9. The coolant temperature sensor 15 detects an engine coolant temperature Tw.

Referring to FIG. 1B, controller 11 includes a microcomputer basically having a CPU (Central Processing Unit) 11a, a ROM (Read Only Memory) 11b, RAM (Random Access Memory) 11c, an Input Port 11d, an Output Port 11f, and a common bus and a peripheral circuitry such as drive circuitry 11f.

In this engine 1, the open-and-closure operations of the electromagnetically operated intake and exhaust valves 5 and 6 in the electromagnetically driven type are controlled at a normal driving state in order to improve the fuel consumption due to the reduction in pumping loss. Especially, a valve opening timing of the intake valve 5 (called, IVO) is set at a proximity to an upper top dead center (TDC) and a valve closure timing of the intake valve 5 (called, IVC) is variably controlled so that the air quantity to be sucked into the cylinder 3 is controlled for the sucked air quantity to reach to a target air quantity. Consequently, a substantial non-throttling drive is enabled to be carried out.

It is desired that the electronically controlled throttle valve 9 is positioned in a full open state in order to give the engine in the non-throttling drive. However, an opening angle of throttle valve 9 is controlled by controller 11 in order to obtain a required vacuum pressure within the intake air passage 7.

Fuel injection (start) timing and fuel injection quantity through the fuel injection valve 10 are controlled by controller 11 on the basis of an engine driving condition. Basically, however, the fuel injection quantity is controlled on the basis of the intake air quantity Qa measured by means of the airflow meter 14 to provide a desired air-fuel ratio.

An ignition timing through an ignition plug 4 is controlled by controller 11 on the basis of the engine driving condition so as to vary the ignition timing at an MBT (Minimum angle for Best Torque) point or knocking limit point.

Next, controls for the valve closure timing of the intake valve 5 (IVC) and the valve open timing (IVO) thereof 5 and the electromagnetically controlled throttle valve 9 will be described in more details with reference to flowcharts shown in FIGS. 3 through 5.

Figure 3:
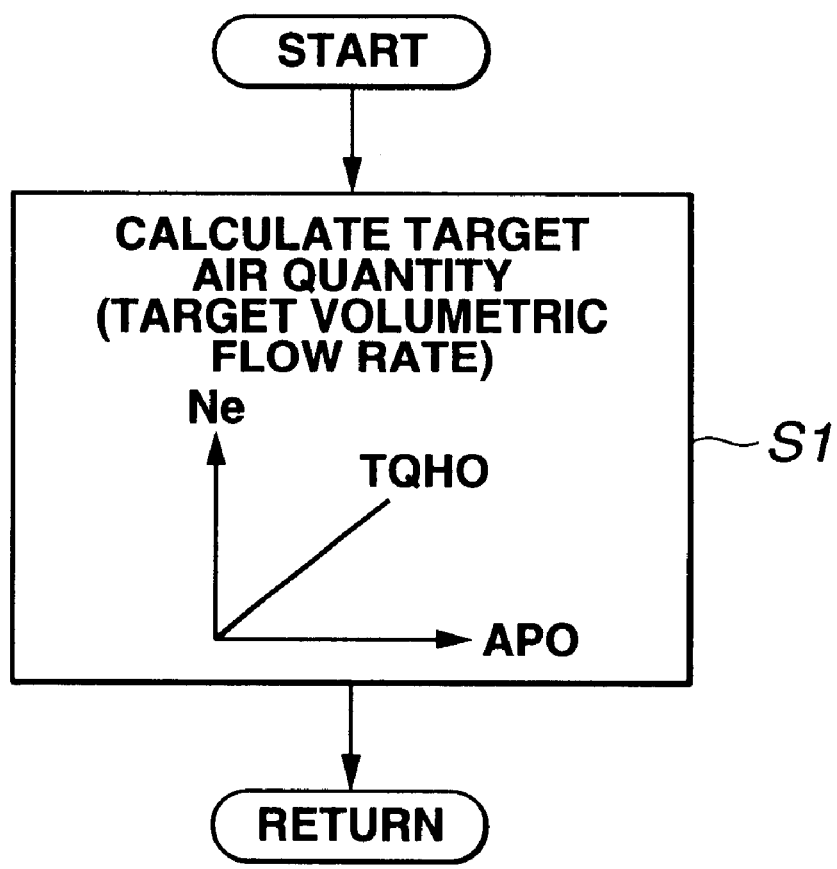
FIG. 3 is an operational flowchart representing a calculation of a target air quantity.

FIG. 3 shows the flowchart representing a calculation of a target air quantity (viz., a target volumetric (volume) flow rate) to be sucked into a corresponding engine cylinder.

At a step S1, controller 11 searches a target air quantity corresponding to a driver's demanding torque as a target volumetric flow rate (TQHO) by searching it from a map shown in FIG. 3 on the basis of accelerator depression angle APO and engine speed Ne.

It is noted that, during an engine idle state (idle switch ON), target volumetric flow rate TQHO is corrected in accordance with a deviation ΔNe between engine speed Ne and a target engine idling speed Nidle (ΔNe=Ne−Nidle). If this deviation ΔNe is minus, TQHO is corrected in an increment direction. If ΔNe>0, TQHO is corrected in a decrement direction. This step S1 corresponds to a target air quantity calculating section.

Suppose that volumetric flow rate QHO (target volumetric flow rate TQHO) is deemed to be equivalent to ηv (a volumetric efficiency).

A value of 1 of QHO means in a static sense of term that the valve closure timing IVC of intake valve 5 is at a time point when piston 2 has reached to a bottom dead center (BDC), viz., at a time point of a maximum cylinder intake stroke volume.

In addition, QHO=0.7 represents that the cylinder intake stroke volume indicates 70% with respect to a maximum stroke volume.

Figure 4:
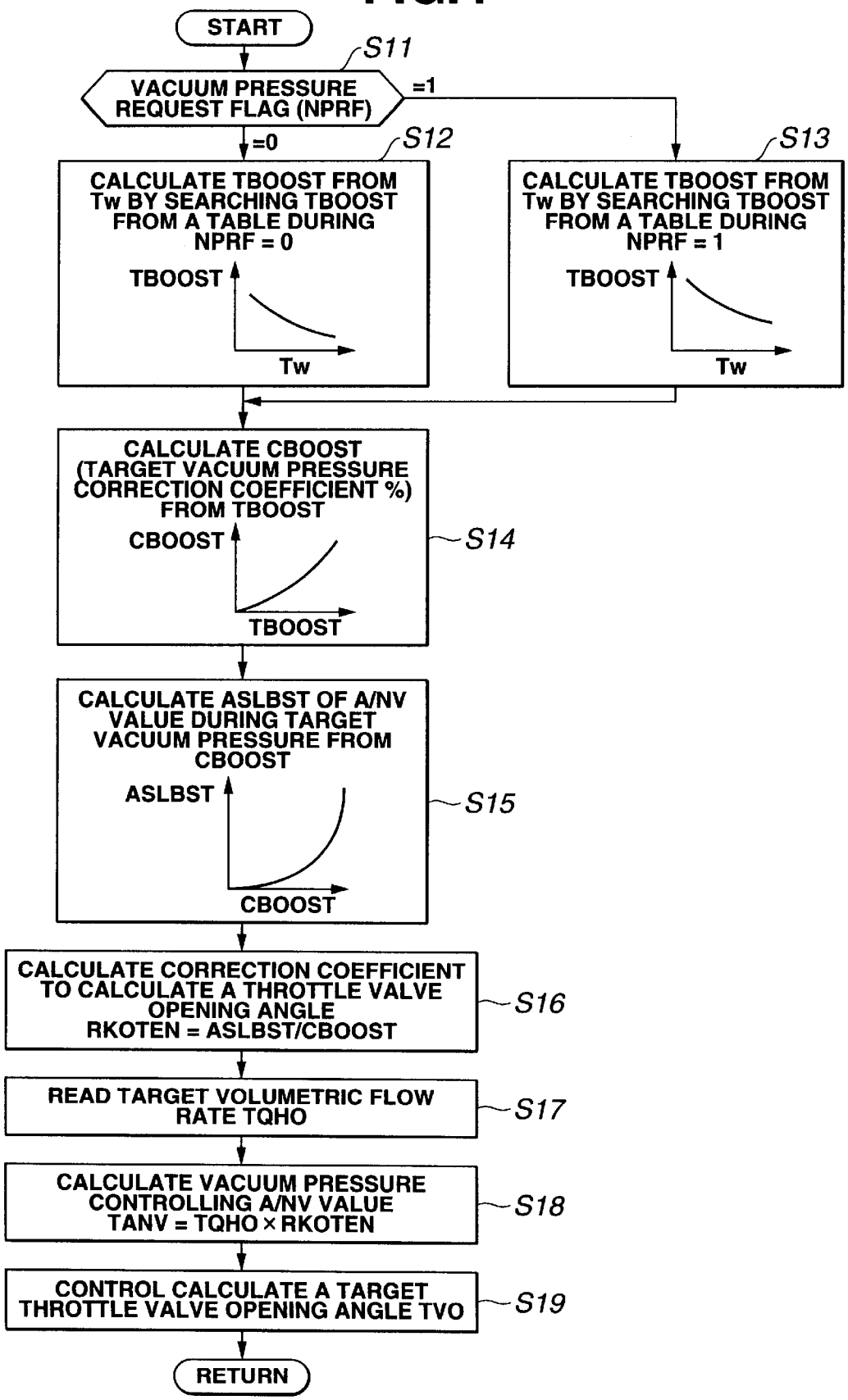
FIG. 4 is an operational flowchart representing a calculation-and-control procedure of a valve open-and-closure timing executed in the controller shown in FIG. 1A.

FIG. 4 shows the flowchart representing a position control for electronically controlled throttle valve 9.

At a step S11, controller 11 determines whether a vacuum pressure request flag (NPRF) is set to "1" or reset to "0" to determine whether there is a request to develop a vacuum pressure in the portion of the intake air passage downstream to the throttle valve 9.

If NPRF="0" (at a normal driving) the routine goes to a step S12.

At the step S12, controller 11 refers to a normal drive table to calculate a target vacuum pressure TBOOST from engine coolant temperature Tw.

If NPRF flag="1", controller 11 determines that there is the request to generate the vacuum pressure and the routine goes to a step S13.

This vacuum pressure request flag NPRF is set to "1" when the vacuum pressure request occurs from the blow-by gas ventilation system, vaporized fuel purge system, and/or the brake master vac. of the vehicular brake system.

Both tables during the normal driving and during the vacuum pressure request indicate that as the coolant temperature Tw becomes lower, the target vacuum pressure TBOOST is set to be higher.

In addition, the target vacuum pressure TBOOST in the case of the active vacuum pressure request table shown at the step S13 is usually higher than that in the case of the normal engine drive state table shown at step S12.

At the next step S14, controller 11 converts target vacuum pressure TBOOST calculated at step S12 or S13 into a target vacuum pressure correction coefficient CBOOST(%) corresponding to volumetric flow rate QHO by referring to a table shown at step S14.

Figure 9:
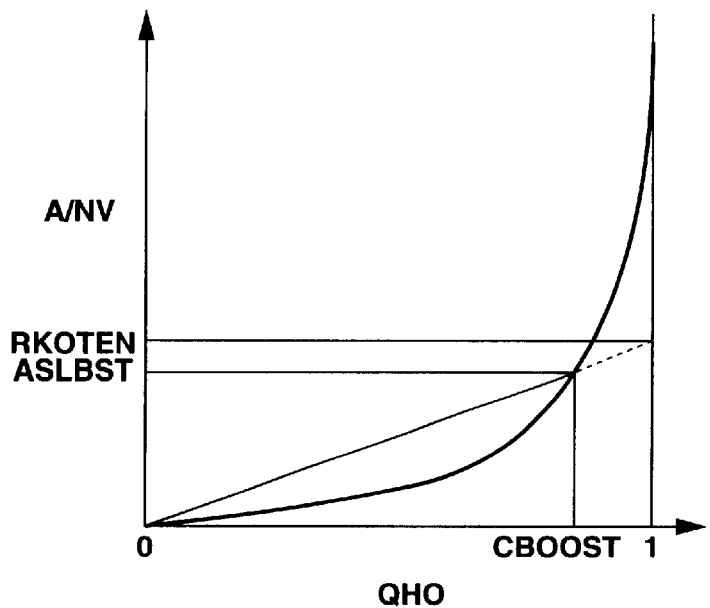
FIG. 9 is a characteristic graph representing a QHO versus A/NV characteristic when a cylinder volume is 100%.

At the next step S15, controller 11 calculates an A/NV value (A/NV value during the development of the target vacuum pressure) viz., ASLBST when QHO=CBOOST from a QHO versus A/NV characteristic curve shown in FIG. 9.

It is noted that A/NV value represents an opening area A of throttle valve 9 divided by a product between engine speed Ne and engine displacement V. The QHO versus A/NV characteristic curve shown in FIG. 9 is a characteristic when no change occurs in the valve closure timing IVC of intake valve 5 and the air quantity (QHO) is controlled only through the opening area of the throttle valve 9 (cylinder volume Vcyl=100%). It is noted that QHO=1 represents that the cylinder is in the atmospheric pressure state and QHO=0 represents that the cylinder is in a vacuum state and the table shown at step S15 corresponds to the characteristic curve shown in FIG. 9.

At the next step S16, controller 11 calculates a throttle valve opening angle calculation coefficient RKOTEN from target vacuum pressure correction coefficient CBOOST calculated at step S14 and ASLBST of the A/NV value during the occurrence of the target vacuum pressure as follows:

$$RKOTEN = ASLBST/CBOOST \tag{1}$$

The throttle valve opening angle correction coefficient RKOTEN corresponds to a gradient of a straight line passing through a point giving the target vacuum pressure on the QHO versus A/NV characteristic curve, shown in FIG. 9, viz., corresponds to A/NV value on the straight line when the volumetric flow rate of QHO=1.

When the vacuum pressure is controlled to be constant (fixed), the QHO versus A/NV characteristic indicates a straight line and a gradient of this line causes the line to pass through the point at which the desired vacuum pressure (CBOOST) on the QHO versus A/NV characteristic curve is derived, during the cylinder volume of 100%, as shown in FIG. 9.

In order to vary the target vacuum pressure during the vacuum pressure constant control, the gradient (RKOTEN) is varied so that an arbitrary vacuum pressure control becomes possible.

Referring back to a step S17 shown in FIG. 4, controller 11 provides a suitable delay processing for the target volumetric flow rate TQHO calculated in the target air quantity calculating flow shown in FIG. 3 and reads it.

At a step S18, controller 11 calculates a vacuum pressure controlling A/NV value, i.e., TANV from the target volumetric flow rate TQHO read at step S17 and the throttle opening angle calculation correction coefficient (gradient) RKOTEN calculated at step S16 as follows:

$$TANV = TQHO \times RKOTEN \qquad (2).$$

Since the vacuum pressure controlling A/NV value TANV has been calculated, a vacuum pressure controlling throttle valve opening area A can be calculated from engine speed Ne and the engine displacement V. Hence, at the step S19, this value TANV is converted into a target opening angle TVO of the electronically controlled throttle valve 9. Consequently, the opening angle of the electronically controlled throttle valve 9 is controlled. Steps S11 through S13 shown in FIG. 4 correspond to target vacuum pressure calculating section. Steps S14 through S19 correspond to throttle valve opening angle controlling section.

Figure 5:
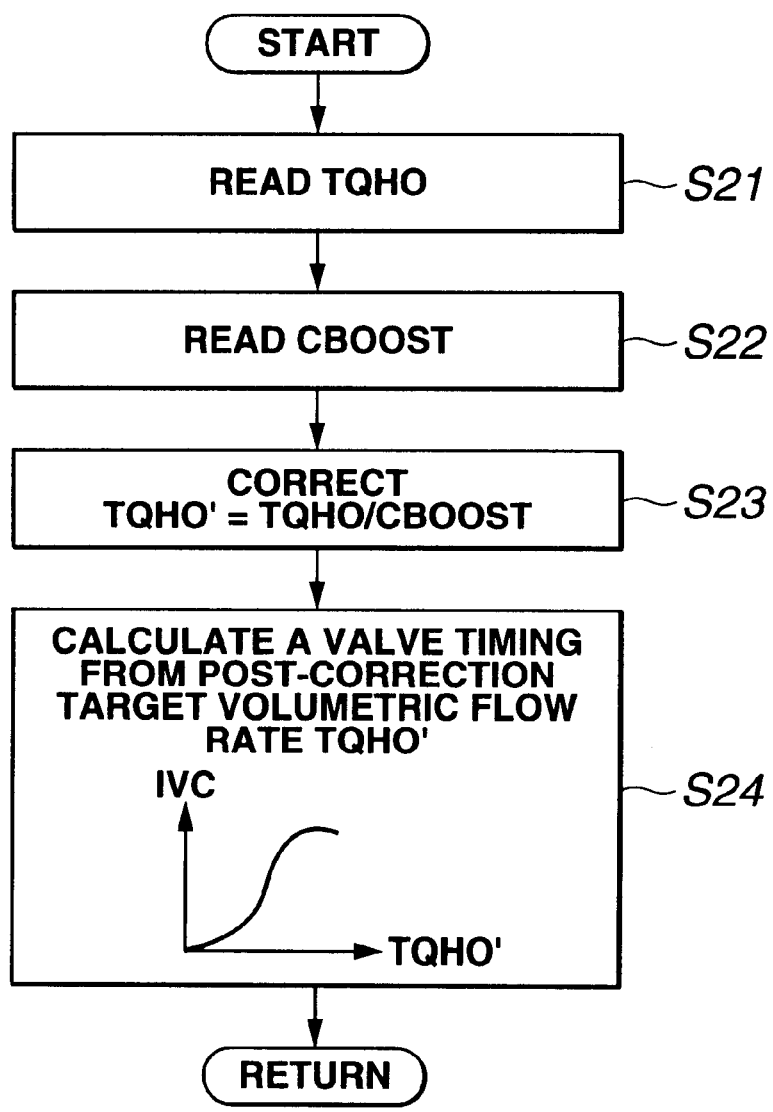
FIG. 5 is an operational flowchart representing a calculation-and-control procedure of a valve open-and-closure timing executed in the controller shown in FIG. 1A.

FIG. 5 shows the flowchart representing a valve timing control procedure executed in the first embodiment of the control apparatus shown in FIG. 1A.

At a step S21, controller 11 reads target volumetric flow rate TQHO as target air quantity calculating flow shown in FIG. 3.

At a step S22, controller 11 reads target vacuum pressure correction coefficient CBOOST calculated in the throttle valve control flowchart shown in FIG. 4.

At a step S23, controller 11 calculates a post-correction target volumetric flow rate TQHO' as a post-correction target air quantity from target volumetric flow rate TQHO and target vacuum pressure correction coefficient CBOOST as follows:

$$TQHO' = TQHO/CBOOST \qquad (3).$$

At a step S24, controller 11 calculates a valve timing to obtain the post-correction target air quantity.

That is to say, while the intake valve open timing TVO is fixed at a proximity to the upper top dead center (TDC), controller 11 refers to the table shown at step S24 of FIG. 5 to calculate the closure timing IVC of intake valve 5 from the post-correction (namely, corrected) target volumetric flow rate TQHO' derived in the equation (3). Specifically, as the post-correction target volumetric flow rate TQHO' becomes smaller, the closure timing IVC of the intake valve 5 is set toward the upper top dead center (TDC) direction. As the post-correction target volumetric flow rate TQHO' becomes larger, the closure timing IVC of intake valve 5 is set toward bottom dead center (BDC) direction.

The flowchart shown in FIG. 5 corresponds to intake valve open-and-closure timing controlling section.

Especially, steps S22 and S23 correspond to vacuum pressure dependent correcting section for correcting the target air quantity (target volumetric flow rate TQHO) to calculate the valve closure timing (IVC) of the intake valve in accordance with the target vacuum pressure (target vacuum pressure correction coefficient CBOOST).

Figure 10:
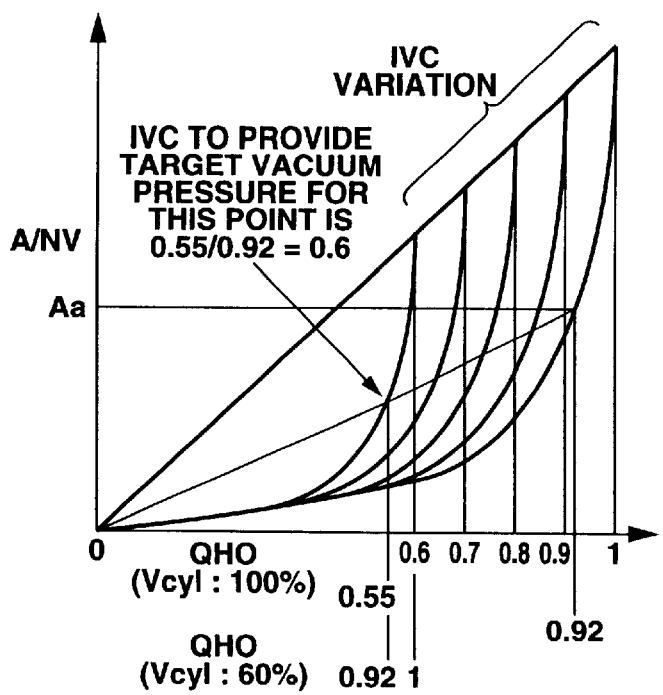
FIG. 10 is a characteristic graph representing the QHO versus A/NV characteristic when a valve closure timing of the intake valve is varied.

FIG. 10 shows a characteristic graph representing the QHO versus A/NV characteristic when the valve closure timing IVC of intake valve 5 (namely, cylinder volume Vcyl is varied) is varied.

This characteristic graph of FIG. 10 represents an analogous constriction form of QHO versus A/NV characteristic shown in FIG. 9 as a base (Vcyl: 100%).

For example, suppose that when the valve closure timing IVC of intake valve 5 is at a maximum (Vcyl: 100%) target volumetric flow rate TQHO is 1.

Since, at this time, QHO is varied at a rate of Vcyl, target volumetric flow rate TQHO indicates 0.6 when Vcyl=60%.

For example, QHO which provides a certain target vacuum pressure when Vcyl=60% is 0.92 and 0.6×0.92= 0.55 when QHO which provides QHO when Vcyl: 100% (this value corresponds to TQHO).

This means that to obtain a certain target vacuum pressure when TQHO=0.55, it is necessary to provide the valve closure timing IVC of intake valve 5 which gives a maximum air quantity at a time point of 0.6=0.55/0.92 of the characteristic line passing through QHO=0.55.

Hence, the vacuum pressure dependent correction for the valve closure timing IVC of intake valve 5 is carried out.

Next, a second preferred embodiment of the control apparatus for the internal combustion engine will be described below.

Figure 6:
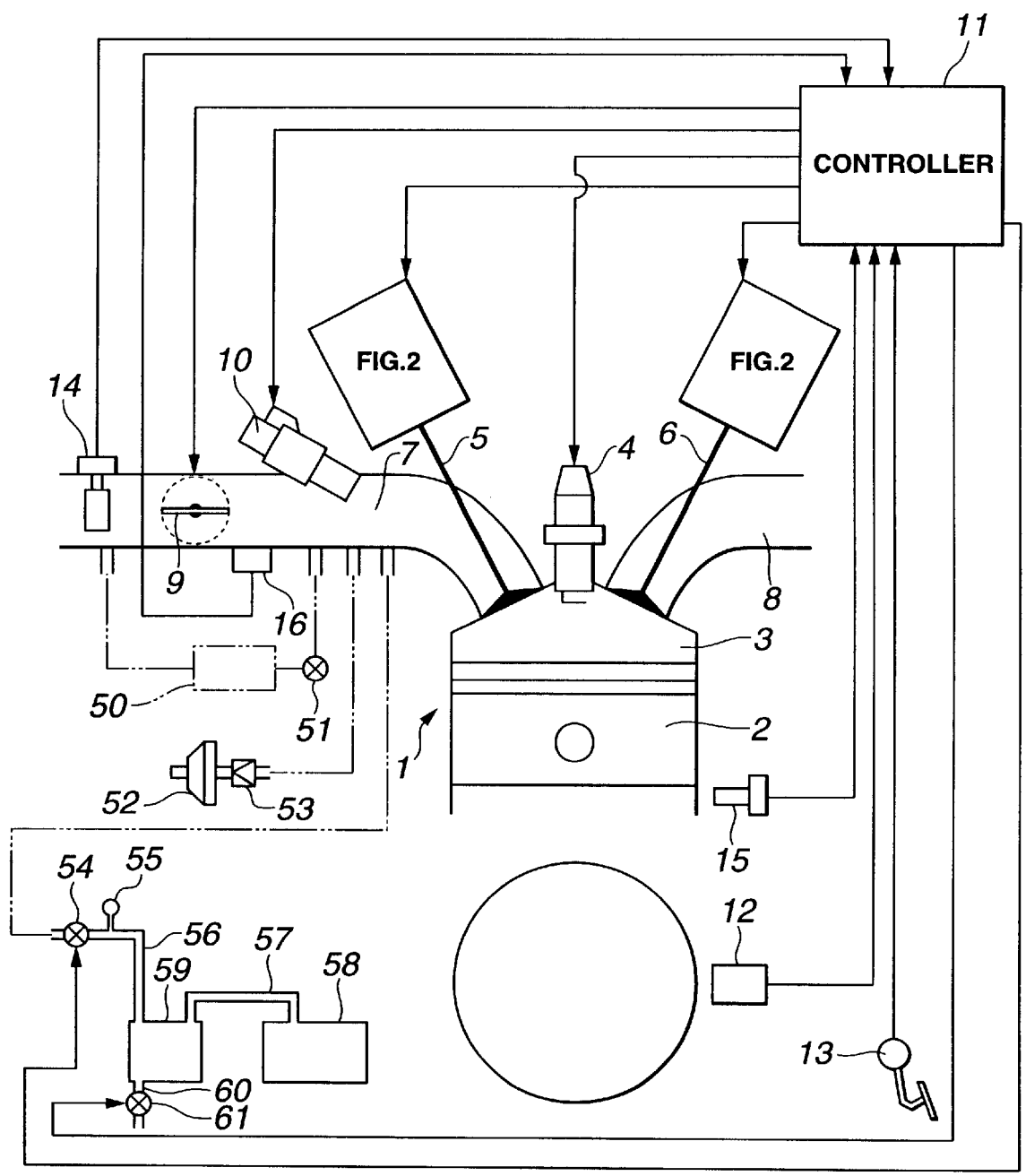
FIG. 6 is a rough configuration view of the internal combustion engine to which the control apparatus in a second preferred embodiment according to the present invention is applicable.

FIG. 6 shows a rough system configuration of the internal combustion engine to which the control apparatus for the internal combustion engine in the second preferred embodiment according to the present invention is applicable.

In the second embodiment, a vacuum pressure sensor 16 is disposed to detect an actual vacuum pressure BOOST on the portion of the intake air passage 7 downstream to the throttle valve 9 and an output signal of the vacuum pressure sensor 16 is supplied to controller 11.

Figure 7:
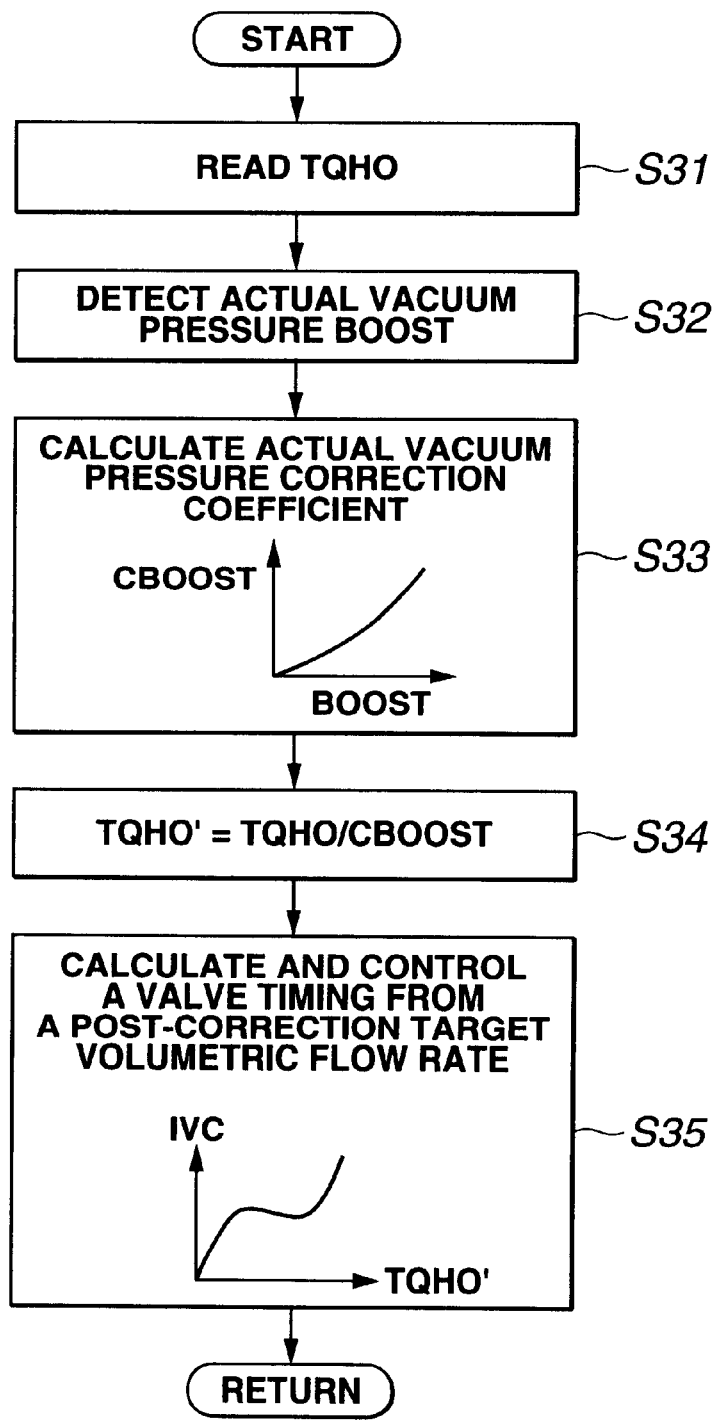
FIG. 7 is an operational flowchart representing a calculation-and-control procedure of the valve open-and-closure timing of the intake valve in a case of the second preferred embodiment of the control apparatus shown in FIG. 6.

FIG. 7 shows the flowchart on the valve timing control, the flowchart being executed in place of FIG. 5 described in the first embodiment.

At a step S31, controller 11 reads the target volumetric flow rate TQHO calculated in the target air quantity calculation flow shown in FIG. 3.

At a step S32, controller 11 reads an actual vacuum pressure BOOST detected by means of vacuum pressure sensor 16.

At a step S33, controller 11 converts actual vacuum pressure BOOST detected at step S32 into actual vacuum pressure correction coefficient CBOOST (%) corresponding to volumetric flow rate QHO by referring to a table map shown at step S23.

At the next step S34, controller 11 calculates the post-correction target volumetric flow rate TQHO' as the post-correction target air quantity from target volumetric flow rate TQHO and actual vacuum pressure correction coefficient CBOOST as follows:

$$TQHO' = TQHO/CBOOST \qquad (4).$$

At the next step S35, controller 11 calculates a valve open-and-closure timing to obtain post-correction target air quantity TQHO. That is to say, while the valve open timing IVO of intake valve 5 is fixed at the proximity to upper top dead center (TDC), controller 11 calculates the closure timing IVC of intake valve 5 by referring to a table as shown at step S35 of FIG. 7 with respect to the post-correction target volumetric flow rate TQHO' and variably controls the closure timing of intake valve 5. Specifically, as the post-correction target volumetric flow rate TQHO' becomes smaller, the closure timing IVC of intake valve 5 is set toward the upper top dead center direction and the closure timing IVC of intake valve is set toward the bottom dead center (BDC) direction as the post-correction target volumetric flow rate TQHO' becomes larger.

This flow of FIG. 7 corresponds to the intake valve open-and-closure timing controlling section and steps S32 through S34 correspond to vacuum pressure dependent correcting section for correcting the target air quantity (target volumetric flow rate TQHO) in accordance with actual boost correction coefficient CBOOST to calculate intake valve closure timing IVC.

A third preferred embodiment of the control apparatus for an internal combustion engine will be described below.

Figure 8:
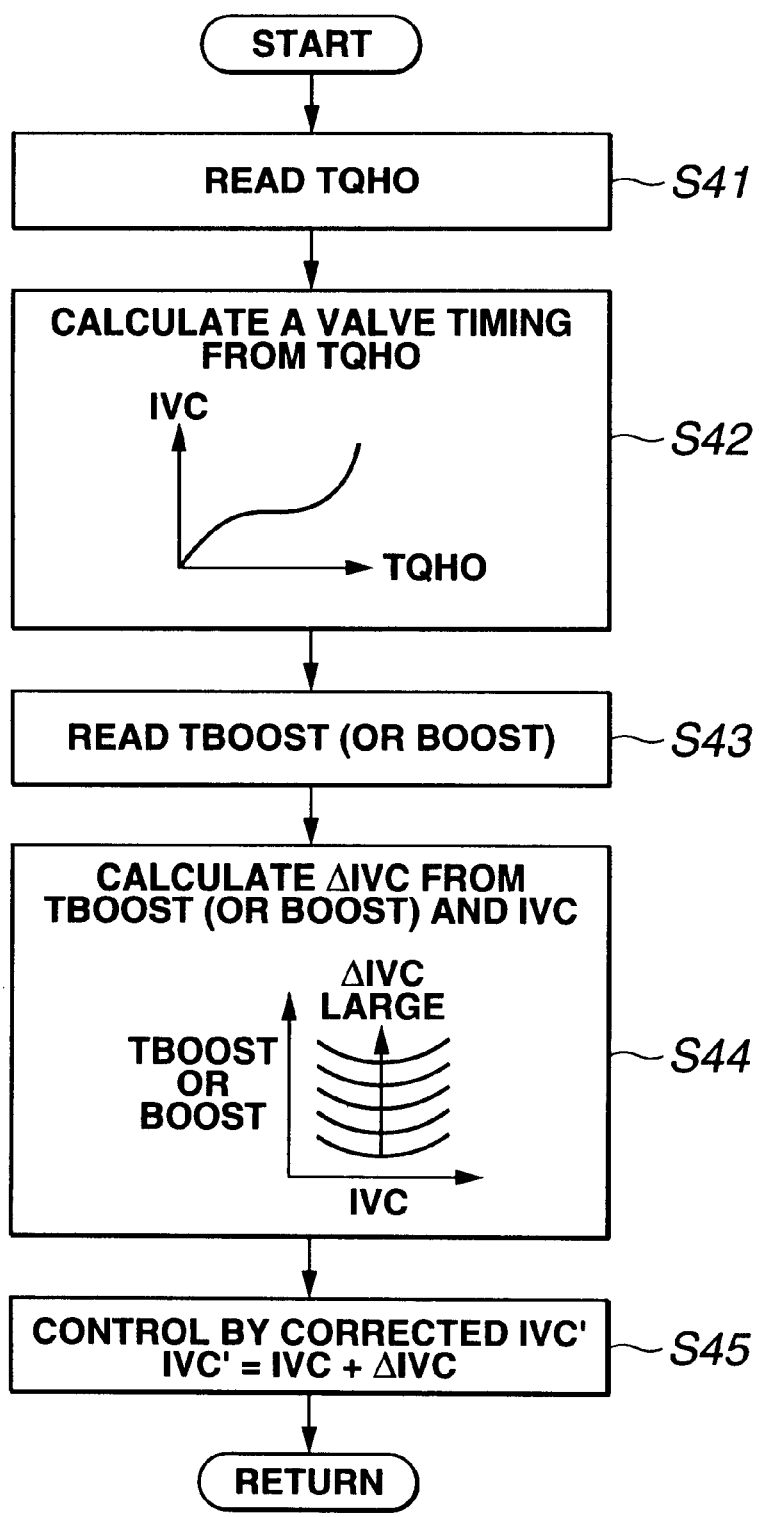
FIG. 8 is an operational flowchart representing the calculation-and-control procedure of the valve open-and-closure timing in a case of a third preferred embodiment of the control apparatus.

FIG. 8 shows the flowchart representing the valve timing control executed in the third preferred embodiment of the control apparatus. The other structure of the control apparatus in the third embodiment is the same as shown in FIG. 1A or FIG. 6.

The program based on the flowchart of FIG. 8 is executed in place of FIG. 5 or FIG. 7 described in the first or second embodiment.

At a step S41, controller 11 reads the target volumetric flow quantity TQHO as target air quantity calculated in the target air quantity calculation flow shown in FIG. 3.

At a step S42, controller 11 calculates the valve open-and-closure timing to obtain the target air quantity.

That is to say, while the valve open timing IVO of intake valve open timing IVO of intake valve 5 is fixed at the proximity to the upper top dead center (TDC), controller 11 calculates valve closure timing IVC of intake valve 5 by referring to a table shown in FIG. 8 with respect to the target volumetric flow rate TQHO. As the target volumetric flow rate TQHO becomes smaller, the valve closure timing IVC of intake valve 5 is set toward the upper top dead center direction. As TQHO becomes larger, the valve closure timing IVC of intake valve 5 is set toward bottom dead center (BDC) direction.

At the next step S43, controller 11 reads either target vacuum pressure (TBOOST) calculated in the flow shown in FIG. 4 or actual vacuum pressure BOOST detected by means of vacuum pressure sensor 16.

At the next step S44, controller 11 refers to a table shown at step S44 in FIG. 8 according to the target vacuum pressure TBOOST or actual vacuum pressure BOOST to calculate a correction value ΔIVC for the valve closure timing IVC of intake valve 5.

It is noted that as target vacuum pressure TBOOST or actual vacuum pressure BOOST becomes higher, the correction value ΔIVC is set to be larger.

At a step S45, controller 11 corrects the valve closure timing IVC of intake valve 5 on the basis of the correction value ΔIVC. That is to say, controller 11 adds the correction value ΔIVC calculated at step S44 to the closure timing IVC of intake valve 5 calculated at step S42 to determine a post-correction intake valve closure timing IVC' as described in the following equation.

$$IVC' = IVC + \Delta IVC \quad (5).$$

As described above, as target vacuum pressure TBOOST (or actual vacuum pressure BOOST) becomes higher, air density becomes reduced. Hence, to compensate for the reduction in air density, the closure timing IVC of intake valve 5 is corrected toward a retardation direction (namely, the intake stroke bottom dead center (BTC) direction).

The flow shown in FIG. 8 corresponds to the intake valve open-and-closure timing controlling section. Especially, the steps S43 through S45 correspond to vacuum pressure dependent correcting section for correcting the valve closure timing IVC of intake valve 5 calculated on the basis of the target air quantity. In each of the first through third embodiments, the electromagnetic operation type variable valve drive unit has been used for each of the engine valves. However, the present invention is applicable to hydraulic operation type variably operated engine valves.

The entire contents of Japanese Patent Application No. 11-356401 filed in Japan on Dec. 15, 1999 are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A control apparatus for an internal combustion engine, comprising:
   a variably operated intake valve enabled for its open-and-closure operation to be arbitrarily controlled;
   a target air quantity calculating section that calculates a target air quantity to be sucked into an engine cylinder on the basis of an engine driving condition;
   a target vacuum pressure calculating section that calculates a target vacuum pressure on the basis of the engine driving condition;
   a throttle valve controlling section that controls a throttle valve disposed in an intake air passage of the engine to achieve the target vacuum pressure; and
   an intake valve open-and-closure timing controlling section that calculates and controls valve open and closure timings of the variably operated intake valve to achieve the target air quantity, wherein the valve closure timing of the variably operated intake valve is varied in accordance with a vacuum pressure developed within a portion of the intake air passage which is located downstream to the throttle valve so as to compensate for variation in air density in the portion of the intake air passage located downstream to the throttle valve.

2. A control apparatus for an internal combustion engine as claimed in claim 1, wherein the intake valve open-and-closuring timing controlling section corrects the valve closure timing of the intake valve in accordance with the target vacuum pressure so that the valve closure timing of the intake valve is varied.

3. A control apparatus for an internal combustion engine as claimed in claim 2, further comprising a vacuum pressure request section that determines whether a request to strengthen the vacuum pressure is established.

4. A control apparatus for an internal combustion engine as claimed in claim 3, further comprising an engine coolant temperature sensor to detect an engine coolant temperature and wherein the target vacuum pressure calculating section calculates the target vacuum pressure in accordance with the engine coolant temperature.

5. A control apparatus for an internal combustion engine as claimed in claim 4, wherein as the engine coolant temperature becomes lower, the target vacuum pressure becomes larger.

6. A control apparatus for an internal combustion engine as claimed in claim 4, wherein when the request is not established, the target vacuum pressure calculating section calculates the target vacuum pressure according to the engine coolant temperature by referring a fist table and when the request is established, the target vacuum pressure is calculated according to the engine coolant temperature by referring to a second table.

7. A control apparatus for an internal combustion engine as claimed in claim 3, wherein the target vacuum pressure when the request is established is larger than the target vacuum pressure when the request is not established.

8. A control apparatus for an internal combustion engine as claimed in claim 3, wherein the request is established when a blow-by gas ventilation demands to develop the vacuum pressure.

9. A control apparatus for an internal combustion engine as claimed in claim 3, wherein the request is established when a vaporized fuel purge system demands to develop the vacuum pressure.

10. A control apparatus for an internal combustion engine as claimed in claim 3, wherein the request is established when a master brake booster of a vehicular brake system demands to develop the vacuum pressure.

11. A control apparatus for an internal combustion engine as claimed in claim 2, wherein the valve closure timing of the intake valve is corrected to be set toward a direction of a bottom dead center during a suction stroke as the vacuum pressure is increased.

12. A control apparatus for an internal combustion engine as claimed in claim 1, further comprising a vacuum pressure sensor to detect an actual vacuum pressure of the portion of the intake air passage which is located downstream to the throttle valve and wherein the intake valve open-and-closure timing controlling section that corrects the intake valve closure timing in accordance with the actual vacuum pressure so that the valve closure timing of the intake valve is varied.

13. A control apparatus for an internal combustion engine as claimed in claim 1, wherein the intake valve open-and-closure timing controlling section corrects the target air quantity so that the valve closure timing of the intake valve is varied.

14. A control apparatus for an internal combustion engine as claimed in claim 13, wherein as a post-correction target air quantity after the correction of the target air quantity becomes larger, the valve closure timing of the intake valve is set toward a direction of a bottom dead center during a suction stroke.

15. A control apparatus for an internal combustion engine as claimed in claim 1, wherein the intake valve open-and-closure timing controlling section corrects the valve closure timing of the intake valve per se calculated on the basis of the target air quantity in accordance with either an actual vacuum pressure within the portion of the intake passage which is located downstream to the throttle valve or the target pressure to be developed therewithin.

16. A control apparatus for an internal combustion engine as claimed in claim 15, wherein as the actual vacuum pressure becomes larger, a correction value for the valve closure timing of the intake valve becomes larger.

17. A control apparatus for an internal combustion engine as claimed in claim 1, wherein the throttle valve is an electronically controlled throttle valve.

18. A control apparatus for an internal combustion engine as claimed in claim 1, the valve open-and-closure timing controlling section controls the valve open-and-closure timing of the intake valve according to the corrected valve closure timing of the intake valve.

19. A control apparatus for an internal combustion engine as claimed in claim 1, wherein the variably operated intake valve comprises a pair of springs to bias the intake valve toward a neutral position; a first electromagnet to attract a movable element associated with a valve stem of the intake valve thereonto to displace the intake valve toward a closure position of the intake valve when energized; and a second electromagnet to attract the movable element thereonto to displace the intake valve toward an open position of the intake valve when energized.

20. A control apparatus for an internal combustion engine as claimed in claim 1, wherein the throttle valve controlling section further calculates a target vacuum pressure coefficient on a basis of the target vacuum pressure, calculates an A/NV value corresponding to the target vacuum pressure correction coefficient, wherein the A/NV value represents an opening area of the throttle valve divided by a product between an engine speed and an engine displacement, calculates a throttle valve opening calculation coefficient on a basis of the A/NV value corresponding to the target vacuum pressure correction coefficient and the target vacuum pressure, calculates a vacuum pressure controlling A/NV value on a basis of the throttle valve opening calculation coefficient and the target air quantity, and calculates a target opening of the throttle valve based on the vacuum pressure controlling A/NV value, the engine speed and the engine displacement, wherein the throttle valve is controlled to the target opening of the throttle valve.

21. A control method for an internal combustion engine, comprising:

calculating a target air quantity to be sucked into an engine cylinder on the basis of an engine driving condition;

calculating a target vacuum pressure on the basis of the engine driving condition;

calculating an opening of a throttle valve disposed in an intake air passage of the engine to achieve the target vacuum pressure;

controlling the opening of the throttle valve in accordance with a result of the calculation of the opening of the throttle valve;

calculating a valve closure timing of a variably operated intake valve to achieve the target air quantity; and controlling the valve closure timing of the variably operated intake valve in accordance with a result of the calculation of the valve closure timing of the variably operated intake valve, wherein the controlled valve closure timing of the variably operated intake valve is varied in accordance with a vacuum pressure developed within a portion of the intake air passage which is located downstream to the throttle valve so as to compensate for variation in air density in the portion of the intake air passage located downstream to the throttle valve.

22. A control apparatus for an internal combustion engine, comprising:

a variably operated intake valve enabled for its open-and-closure operation to be arbitrarily controlled;

a target air quantity calculating section that calculates a target air quantity to be sucked into an engine cylinder on the basis of an engine driving condition;

a target vacuum pressure calculating section that calculates a target vacuum pressure on the basis of the engine driving condition;

a throttle valve controlling section that controls a throttle valve disposed in an intake air passage of the engine to achieve the target vacuum pressure; and an intake valve open-and-closure timing controlling section that calculates and controls valve open and closure timings of the variably operated intake valve to achieve the target air quantity, wherein the valve closure timing of the variably operated intake valve is corrected in accordance with either an actual vacuum pressure developed within a portion of the intake air passage which is located downstream to the throttle valve or the target vacuum pressure to be developed therewithin.

23. A control apparatus for an internal combustion engine as claimed in claim 22, wherein the throttle valve is an electronically controlled throttle valve.

24. A control apparatus for an internal combustion engine as claimed in claim 22, wherein as the actual vacuum pressure becomes larger, a correction value for the valve closure timing of the intake valve becomes larger.

25. A control apparatus for an internal combustion engine, comprising:
   a variably operated intake valve enabled for its open-and-closure operation to be arbitrarily controlled;
   a target air quantity calculating section that calculates a target air quantity to be sucked into an engine cylinder on the basis of an engine driving condition;
   a vacuum pressure request section that determines whether a request to strengthen a vacuum pressure is established and wherein a target vacuum pressure is calculated in accordance with an engine coolant temperature:
      a throttle valve controlling section that controls a throttle valve disposed in an intake air passage of the engine to achieve the target vacuum pressure; and
      an intake valve open-and-closure timing controlling section that calculates and controls valve open and closure timings of the variably operated intake valve to achieve the target air quantity, wherein the valve closure timing of the variably operated intake valve is corrected in accordance with an actual vacuum pressure developed within a portion of the intake air passage which is located downstream to the throttle valve.

26. A control apparatus for an internal combustion engine as claimed in claim 25, further comprising an engine coolant temperature sensor to detect an engine coolant temperature and wherein the target vacuum pressure calculating section calculates the target vacuum pressure in accordance with the engine coolant temperature.

27. A control apparatus for an internal combustion engine as claimed in claim 26, wherein as the engine coolant temperature becomes lower, the target vacuum pressure becomes larger.

28. A control apparatus for an internal combustion engine as claimed in claim 26, wherein when the request is not established, the target vacuum pressure calculating section calculates the target vacuum pressure according to the engine coolant temperature by referring a first table and when the request is established, the target vacuum pressure is calculated according to the engine coolant temperature by referring to a second table.

29. A control apparatus for an internal combustion engine as claimed in claim 25, wherein the target vacuum pressure when the request is established is larger than the target vacuum pressure when the request is not established.

30. A control apparatus for an internal combustion engine as claimed in claim 25, wherein the request is established when a blow-by gas ventilation demands to develop the vacuum pressure.

31. A control apparatus for an internal combustion engine as claimed in claim 25, wherein the request is established when a vaporized fuel purge system demands to develop the vacuum pressure.

32. A control apparatus for an internal combustion engine as claimed in claim 25, wherein the request is established when a master brake booster of a vehicular brake system demands to develop the vacuum pressure.

33. A control apparatus for an internal combustion engine as claimed in claim 25, wherein the valve closure timing of the intake valve is corrected to be set toward a direction of a bottom dead center during a suction stroke as the vacuum pressure is increased.

34. A control apparatus for an internal combustion engine, comprising:
   a variably operated intake valve enabled for its open-and-closure operation to be arbitrarily controlled;
   a target air quantity calculating section that calculates a target air quantity to be sucked into an engine cylinder on the basis of an engine driving condition;
   a target vacuum pressure calculating section that calculates a target vacuum pressure on the basis of the engine driving condition;
   a throttle valve controlling section that controls a throttle valve disposed in an intake air passage of the engine to achieve the target vacuum pressure; and
   an intake valve open-and-closure timing controlling section that corrects the target air quantity in accordance with a vacuum pressure developed within a portion of the intake air passage which is located downstream to the throttle valve and controls valve open and closure timings of the variably operated intake valve in accordance with the corrected target air quantity, wherein the valve closure timing of the variably operated intake valve is set toward a direction of a bottom dead center during a suction stroke as the corrected target air quantity becomes larger.

35. A control apparatus for an internal combustion engine, comprising:
   a variably operated intake valve enabled for its open-and-closure operation to be arbitrarily controlled comprising
      an intake valve having a valve stem,
      a pair of springs configured to bias the intake valve toward a neutral position,
      a first electromagnet configured to attract a movable element associated with the valve stem so as to displace the intake valve toward a closure position of the intake valve when the first electromagnet is energized, and
      a second electromagnet configured to attract the movable element associated with the valve stem so as to displace the intake valve toward an open position of the intake valve when the second electromagnet is energized;
   a target air quantity calculating section that calculates a target air quantity to be sucked into an engine cylinder on the basis of an engine driving condition;
   a target vacuum pressure calculating section that calculates a target vacuum pressure on the basis of the engine driving condition;
   a throttle valve controlling section that controls a throttle valve disposed in an intake air passage of the engine to achieve the target vacuum pressure; and
   an intake valve open-and-closure timing controlling section that calculates and controls valve open and closure timings of the variably operated intake valve to achieve the target air quantity, wherein the valve closure timing of the variably operated intake valve is varied in accordance with a vacuum pressure developed within a portion of the intake air passage which is located downstream to the throttle valve.

36. A control apparatus for an internal combustion engine, comprising:

a variably operated intake valve enabled for its open-and-closure operation to be arbitrarily controlled;

a target air quantity calculating section that calculates a target air quantity to be sucked into an engine cylinder on the basis of an engine driving condition;

a target vacuum pressure calculating section that calculates a target vacuum pressure on the basis of the engine driving condition;

a throttle valve controlling section that controls a throttle valve disposed in an intake air passage of the engine to achieve the target vacuum pressure by calculating a target vacuum pressure coefficient on a basis of the target vacuum pressure, calculating an A/NV value corresponding to the target vacuum pressure correction coefficient, wherein the A/NV value represents an opening area of the throttle valve divided by a product between an engine speed and an engine displacement, calculating a throttle valve opening calculation coefficient on a basis of the A/NV value corresponding to the target vacuum pressure correction coefficient and the target vacuum pressure, calculating a vacuum pressure controlling A/NV value on a basis of the throttle valve opening calculation coefficient and the target air quantity, calculating a target opening of the throttle valve based on the vacuum pressure controlling A/NV value, the engine speed and the engine displacement, and controlling the throttle valve to the target opening of the throttle valve; and an intake valve open-and-closure timing controlling section that calculates and controls valve open and closure timings of the variably operated intake valve to achieve the target air quantity, wherein the valve closure timing of the variably operated intake valve is varied in accordance with a vacuum pressure developed within a portion of the intake air passage which is located downstream to the throttle valve.

* * * * *